United States Patent [19]
Matsunaga et al.

[11] Patent Number: 6,046,553
[45] Date of Patent: Apr. 4, 2000

[54] ELECTRICAL VEHICLE CONTROL DEVICE HAVING FAIL-SAFE

[75] Inventors: Yasuo Matsunaga, Kanagawa-ken; Eiichi Ohtsu; Hiroyuki Yamada, both of Ibaraki-ken, all of Japan

[73] Assignees: Nissan Motor Co., Ltd., Kanagawa-ken; Hitachi, Ltd., Tokyo; Hitachi Car Engineering Co., Ltd., Ibaraki-ken, all of Japan

[21] Appl. No.: 09/109,186

[22] Filed: Jul. 2, 1998

[30] Foreign Application Priority Data

Jul. 4, 1997 [JP] Japan .................................. 9-179949

[51] Int. Cl.[7] .................................................. H02H 5/04
[52] U.S. Cl. .............................................. 318/139; 361/23
[58] Field of Search ...................... 318/139, 254, 318/723, 439, 701, 434, 68, 466–470; 388/907; 361/23, 25; 341/9, 1–3

[56] References Cited

U.S. PATENT DOCUMENTS

| | | | |
|---|---|---|---|
| 3,719,878 | 3/1973 | Ferguson et al. | 318/565 |
| 4,095,763 | 6/1978 | Builta | 244/194 |
| 4,159,444 | 6/1979 | Bartlett et al. | 318/564 |
| 5,357,181 | 10/1994 | Mutoh et al. | 318/139 |
| 5,444,340 | 8/1995 | Tamaki et al. | 318/139 |
| 5,629,567 | 5/1997 | Kumar | 290/3 |
| 5,631,819 | 5/1997 | Masaki et al. | |
| 5,650,779 | 7/1997 | Sugden | 341/9 |
| 5,708,338 | 1/1998 | Cook et al. | 318/466 |

FOREIGN PATENT DOCUMENTS 5-122801  5/1993  Japan .

*Primary Examiner*—Jonathan Salata
*Attorney, Agent, or Firm*—McDermott, Will & Emery

[57] ABSTRACT

A control device for controlling a motor of an electrical vehicle is provided with a motor control circuit 7 having a first calculation control circuit 11 and a second calculation control circuit 12. In operation, the motor control circuit 7 allows the first and second calculation control circuits 11, 12 to respectively calculate motor control commands It*, Im* and Its*, Ims* on the basis of inputted identical driving condition. The circuit 7 compares the motor control commands It*, Im* calculated by the first calculation control circuit 11 with the motor control commands Its*, Ims* by the second calculation control circuit 12, respectively. When a difference between the calculated commands It* and Its* and another difference between the calculated commands Im* and Ims* are equal to or more than a predetermined value, then the motor control circuit 7 outputs a stop command to stop an operation of the motor.

5 Claims, 10 Drawing Sheets

ELECTRICAL VEHICLE CONTROL DEVICE HAVING FAIL-SAFE

BACKGROUND OF THE INVENTION

The present invention relates to a control device for controlling a traveling motor of an electrical vehicle.

Conventional arts include a control device for an electrical vehicle which is equipped with a vehicle controller and a motor controller both having respective micro-computers and memory units, for example in Japanese Unexamined Patent Publication (kokai) No. 5-122801. In the control device, when data is not periodically transmitted from the controller on one hand to the memory unit of the other controller on the other hand or when the same data has been inputted in either one of the memory units for a predetermined time, then the control device judges that at least either one of the controllers has a trouble, so that the operation of the control device is stopped.

In the above-mentioned conventional control device for the electrical vehicle, however, there exists a problem of taking a lot of time to detect the error ranges of output signals from the respective controllers and a problem that only checking of the data memorized in the memory units and inputted/outputted data does not allow the control device to confirm whether a motor is formally driven in accordance with a control command from the motor controller.

SUMMARY OF THE INVENTION

It is therefore an object of the present invention to provide a control device for an electrical vehicle, which is capable of judging a calculation result obtained by a controller quickly and certainly, whereby the device's accuracy in controlling the driving of the motor can be judged.

The above object of the present invention described above can be accomplished by a control device for an electrical vehicle having a battery and a motor driven by the battery, the control device comprising:

a power inverting circuit for inverting a direct current power supplied from the battery into an alternating current power to apply the alternating current power to the motor, and a motor control circuit for controlling an operation of the power inverting circuit in accordance with a torque command, the motor control circuit having a first calculation control circuit and a second calculation control circuit;

wherein the first and second calculation control circuits calculate an identical motor control command and compares a first calculation result by the first calculation control circuit with a second calculation result by the second calculation control circuit; and wherein the motor control circuit outputs a stop command to interrupt the alternating current power applied to when a difference between the first calculation result and the second calculation result is equal to or more than a predetermined value.

According to the above-mentioned invention, since the identical motor control command is calculated and compared by the first and second calculation control circuits and the stop command is outputted when the difference between the first calculation result and the second calculation result is equal to or more than the predetermined value, it is possible to detect a range of error in calculating the motor control commands rapidly, whereby the reliability of the control device for the electric vehicle can be improved.

According to the second aspect of the invention, the above control device further comprises first and second rotary angle detector operationally connected to the motor, for detecting rotary angles of the motor;

wherein the first calculation control circuit calculates a motor electric angle ($\theta m$) on the basis of the rotary angle detected by the first rotary angle detector, while the second calculation control circuit calculates a motor electric angle ($\theta s$) on the basis of the rotary angle detected by the second rotary angle detector; and wherein the motor control circuit outputs the stop command to interrupt the alternating current power applied to when a difference between the motor electric angle ($\theta m$) and the motor electric angle ($\theta s$) is equal to or more than the predetermined value.

In this case, the first and second calculation control circuits calculate the motor electric angles on the basis of the rotary angles detected by the first and secondary rotary angle detector, respectively, and the motor control circuit outputs the stop command to interrupt the alternating current power applied to when the difference between the respective motor electric angles is equal to or more than the predetermined value. Thus, it is possible to detect a range of error in calculating the motor electric angle rapidly, whereby the reliability of the control device for the electric vehicle can be improved.

According to the third aspect of the invention, alternatively, the control device further comprises first and second rotary angle detector operationally connected to the motor, for detecting rotary angles of the motor;

wherein the first calculation control circuit periodically calculates a motor electric angle ($\theta m$) on the basis of the rotary angle detected by the first rotary angle detector, while the second calculation control circuit periodically calculates a motor electric angle ($\theta s$) on the basis of the rotary angle detected by the second rotary angle detector; and wherein the first calculation control circuit calculates a first difference ($\Delta\theta m$) between the present motor electric angle ($\theta m$) and the previous motor electric angle ($\theta m-1$) and the second calculation control circuit calculates a second difference ($\Delta\theta s$) between the present motor electric angle ($\theta s$) and the previous motor electric angle ($\theta s-1$), and the motor control circuit outputs the stop command to interrupt the alternating current power applied to when a difference between the first difference ($\Delta\theta m$) and the second difference ($\Delta\theta s$) is equal to or more than the predetermined value.

Also in this case, it is possible to detect a range of error in calculating the motor electric angle rapidly, whereby the reliability of the control device for the electric vehicle can be improved. According to the fourth aspect of the invention, in the control device of the second aspect, the motor is a three-phase alternating current motor, the control devise further comprising current detector for detecting three-phase alternating currents flowing through the motor, wherein the first calculation control circuit converts the three-phase currents detected by the current detector into two-phase currents on the basis of the motor electric angle ($\theta m$) and also executes a current feed-back control of the motor while comparing the two-phase currents with the motor control command calculated by itself; and wherein the second calculation control circuit converts the three-phase currents detected by the current detector into two-phase currents on the basis of the motor electric angle ($\theta m$) calculated by the first calculation control circuit and also outputs the stop command to interrupt the alternating current power applied to when a difference between the two-phase currents and the motor control command calculated by itself is equal to or more than the predetermined value.

In this case, the three-phase currents are converted into the two-phase currents on the basis of the motor electric angle (θm) and the stop command is outputted when either one of the difference between the two-phase currents and the motor control commands is equal to or more than the predetermined value. Thus, it is possible to detect the accuracy of an operation in the motor control, whereby the reliability of the control device for the electric vehicle can be improved. Further, since the three-phase currents are converted into the two-phase currents by the first and second calculation control circuits on the basis of the identical motor electric angle (θm), it is possible to reduce the conversion error in converting the currents resulting from the detection error of the electric angle, whereby the reliability of the control device for the electric vehicle can be improved furthermore.

According to the fifth aspect of the invention, in the aforementioned control device, the first and second calculation control circuits are constituted in the form of software of different micro-computers, respectively. In this case, there is no possibility that the reliability of the control device is influenced with respect to the number of constituting parts of the device.

The above and other features and advantages of this invention will become apparent, and the invention itself will best be understood, from a study of the following description and appended claims, with reference had to the attached drawings showing a preferred embodiment of the invention.

DESCRIPTION OF THE PREFERRED EMBODIMENT

Embodiments of the present invention will be described with reference to the accompanying drawings. The U.S. Pat. No. 5,631,819 is incorporated by reference herein in its entirely.

(First Embodiment)

Figure 1:
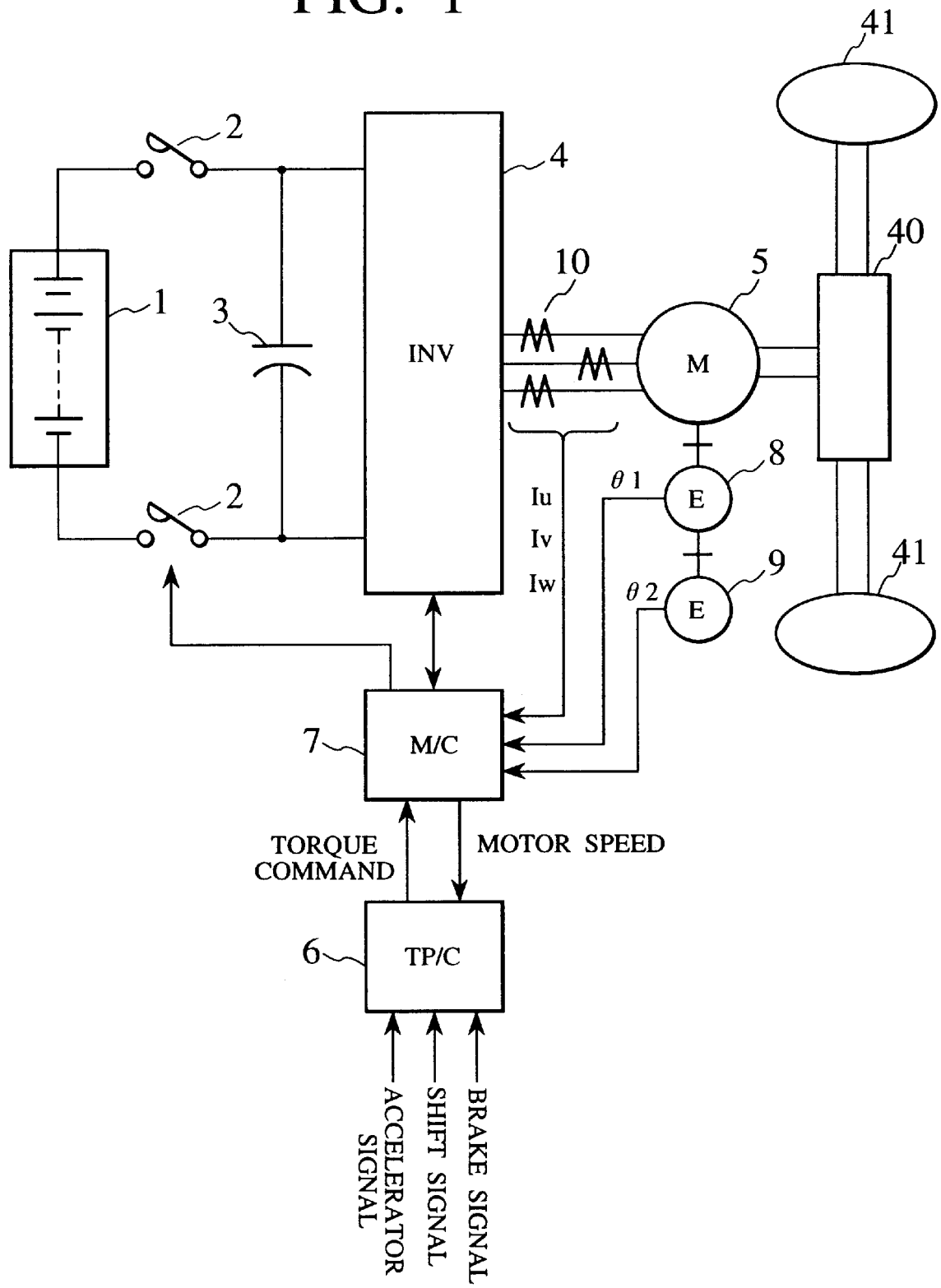
FIG. 1 is a schematic view showing a constitution of a control device for the electrical vehicle, in accordance with a first embodiment of the present invention.

FIG. 1 shows a control device in accordance with a first embodiment of the present invention.

A battery 1 supplies a power inverter 4 with electric power of direct current, through the intermediary of switches 2 and a DC (direct current) link condenser 3. The power inverter 4 operates to convert DC power into AC (alternating current) power and apply it to a three-phase induction motor 5. The power inverter 4 is controlled by a torque processing controller 6 and a motor controller 7 both of which control the traveling of an electrical vehicle (not shown). The three-phase induction motor 5 is mechanically connected with two encoders 8, 9 both generating rotary angle signals of the motor 5 to the motor controller 7. A current sensor 10 is provided to detect three-phase currents Iu, Iv, Iw and further output the detected currents to the motor controller 7. The motor 5 serves to drive wheels 41 through the transmission 40 in a vehicle.

The torque processing controller 6 calculates a torque command on the basis of an acceleration signal, a shift signal, a brake signal and the number of revolutions of the motor i.e. motor speed, and also outputs the so-calculated torque command for the motor controller 7. The motor controller 7, which is a control device for controlling the inverter 4 in vector, calculates PWM signals for activating switching elements in the inverter 4 in accordance with the above torque command from the torque processing controller 6, the rotary angle signals from the encoders 8, 9, and the motor currents Iu, Iv, Iw from the current sensor 10. Namely, the motor controller 7 controls the three-phase AC motor 5 by the well-known vector control method, through the feed-back control computation of the motor speed and the motor current for the three-phase AC motor 5. A motor control calculating circuit in the motor controller 7 outputs T-axis current command IT and m-axis current command Im defined on a rotating coordinate system, as well as a rotation angle of the rotating coordinate system defined relative to a corresponding stationary coordinate system. Here, T-axis is assumed to coincide with an axis of the rotating flux of the AC motor 5, and m-axis to be orthogonal thereto. These outputs from the motor control calculating circuit are inputted into the current control circuit, where PWM signals for producing three-phase AC current are calculated to the inverter 4. Whereby, the three-phase AC motor can be driven with a torque as desired. Additionally, the motor controller 7 executes to judge respective ranges of errors involved in the calculated motor control commands and the actual control situation for the motor 5. Depending on the so estimated error ranges and control situation for the motor 5, the controller 7 may output a stop signal to the inverter 4 and open the switches 2 in order to cut off the power supply for the inverter 4.

Meanwhile, although this embodiment employs a three-phase induction motor as the motor 5 and respective vector-controlled inverters as the motor controller 7 and the inverter 4, the sorts of motor and inverted are not limited to the embodiment. For example, the invention may be directed to control a vector-controlled inverted for a synchronous motor described later.

Figure 2:
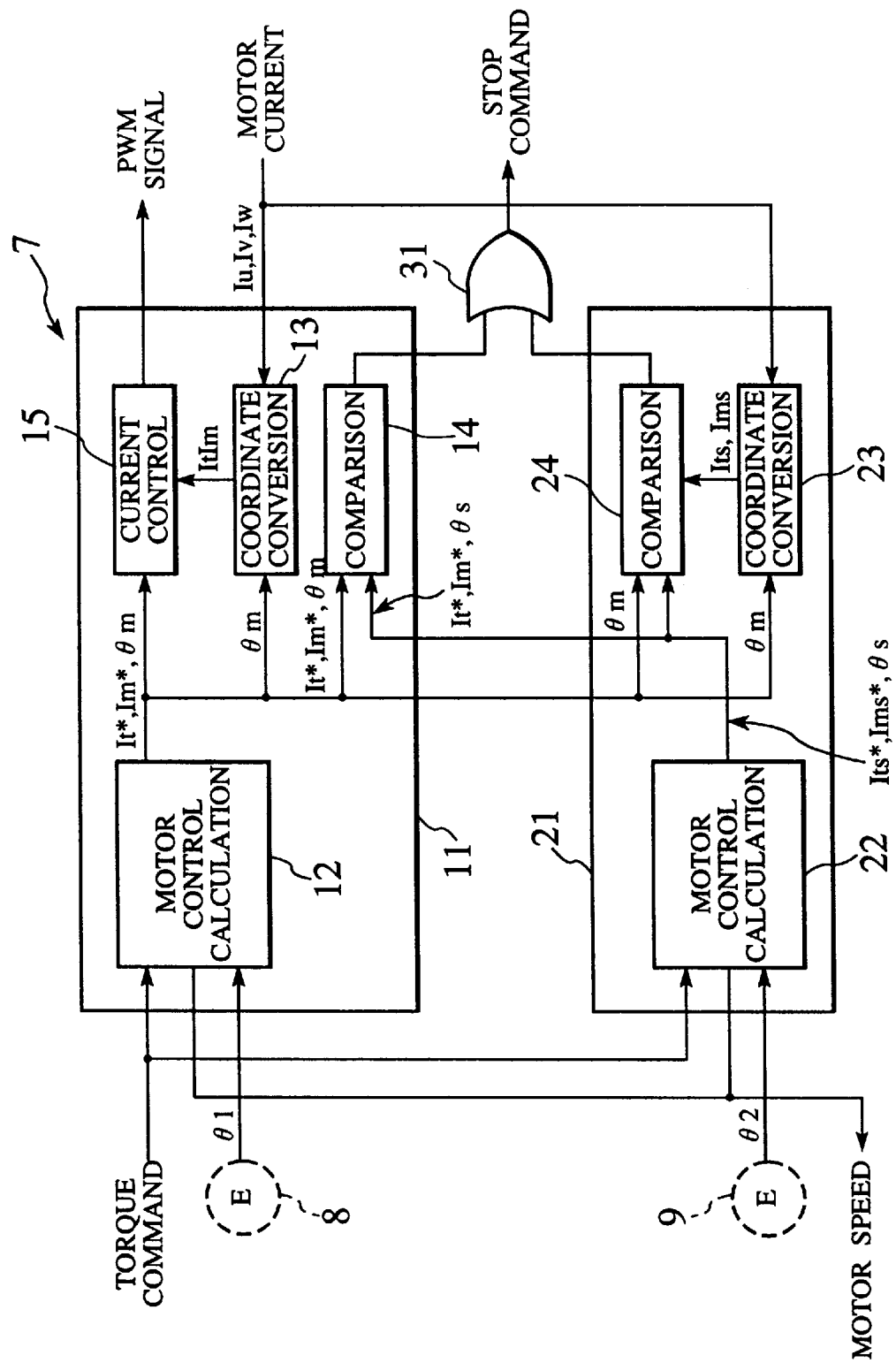
FIG. 2 is a block diagram of a motor controller of the control device of the first embodiment.

FIG. 2 is a control block diagram of the motor controller 7.

According to the embodiment, the motor controller 7 comprises a main micro-computer 11, a substitute micro-computer 21 and an OR circuit 31. The micro-computers 11, 21 each calculate motor control commands for controlling an operation of the motor 5 and mutually compare with each other in order to detect the error range contained in the respective results of the control command calculation. The micro-computers 11, 21 further compare the motor control commands with the actual operation of the so-controlled motor, so that the control situation for the motor 5 is judged.

The main micro-computer 11 includes a motor control calculating section 12, a coordinates converting section 13, a comparator section 14 and a current control section 15, all of which are constituted in the form of software. In accordance with the torque command from the torque processing controller 6 and the rotary angle signals from the encoder 8, the motor control calculating section 12 calculates a torque current command (It*), an exciting current command (Im*) and a motor electrical angle (θ*), all of which are regarded as the motor control commands. On the basis of the motor electrical angle (θm) calculated by the motor control calculating section 12, the coordinates converting section 13 coordinately converts three motor currents (Iu, Iv, Iw) detected by the current sensor 10 into two feed-back values (It, Im) for the torque current and the exciting current (i.e. 3/2 phase conversion), respectively. The comparator section 14 respectively compares the motor control commands (It*, Im*, θm) calculated by the motor control calculating section 12 with the motor control commands (It*, Ims*, θs) calculated by a motor control calculating section 22 of the substitute micro-computer 21 described later. When at least one of the respective differences between the former commands (It*, Im*, θm) and the later commands (Its*, Ims*, –θs) is equal to or more than a predetermined value for each command, then the comparator section 14 outputs a stop signal to the OR circuit 31. Based on the inputted motor control commands (It*, Im*, θm) and the converted feed-back values (It, Im), the current control section 15 executes the current feed-back control to output the PMW signals to the inverter 4.

The substitute micro computer 21 includes the motor control calculating section 22, a coordinates converting section 23 and a comparator section 24, all of which are constituted in the form of software. The motor control calculating section 22 calculates a torque current command (Its*), an exciting current command (Ims*) and a motor electrical angle (θs), all of which are also regarded as the motor control commands, on the basis of the torque command from the torque processing controller 6 and the rotary angle signals from the encoder 9. The coordinates converting section 23 coordinately converts three motor currents (Iu, Iv, Iw) detected by the current sensor 10 into two feed-back values (Its, Ims) of the torque current and the exciting current (i.e. the above-mentioned 3/2 phase conversion), on the basis of the motor electrical angle (θm) calculated by the motor control calculating section 12 of the main micro-computer 11. The comparator section 24 respectively compares the motor control commands (Its*, Ims*) calculated by the motor control calculating section 22 with the current feed-back values (Its, Ims) converted by the coordinates converting section 23 and also compares the motor electrical angle (θm) calculated in the main micro computer 11 with the motor electrical angle (θs) calculated in the substitute micro computer 11.

Similarly to the comparator section 14, when at least one of the respective differences between the former commands (Its*, Ims*, θm) and the later commands (Its, Ims, θs) is equal to or more than a predetermined value for each command, then the comparator section 24 outputs a stop signal to the OR circuit 31.

Figure 3:
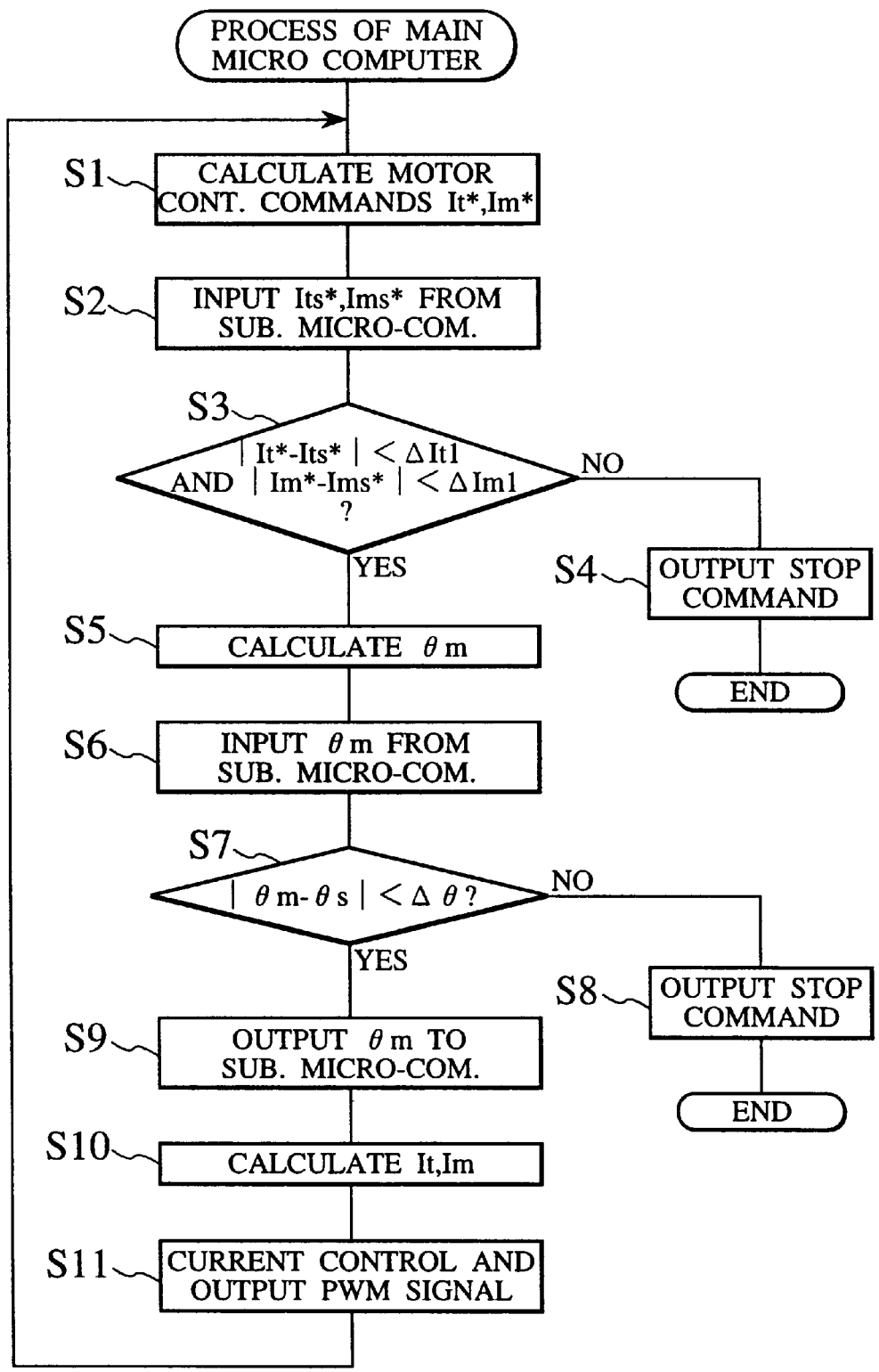
FIG. 3 is a flow chart showing processes by a main micro-computer of the motor controller of FIG. 2.
Figure 4:
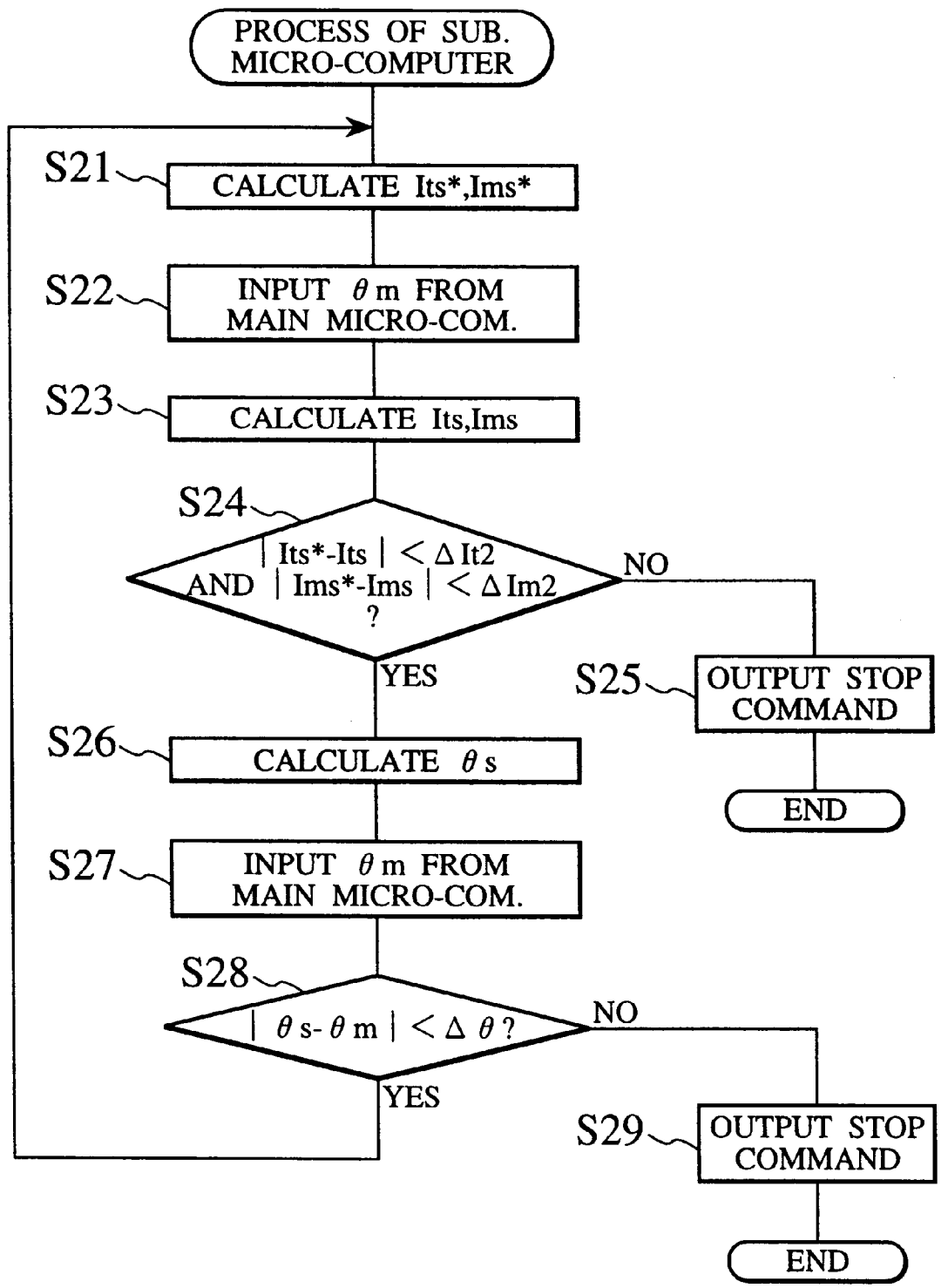
FIG. 4 is a flow chart showing processes by a substitute micro-computer of the motor controller of FIG. 2.

FIG. 3 is a flow chart showing an operation of the main micro-computer 11 and FIG. 4 is a flow chart showing an operation of the substitute micro-computer 21. With reference to these flow charts, we now describe the operation of the first embodiment.

When the device is energized in power, then the main micro-computer 11 executes processes of FIG. 3 repeatedly. At step S1, it is executed to calculate the torque current command (It*) and the exciting current command (Im*) on the basis of the torque command and the rotary angle signal. Next, at sequent step S2, it is executed to input the torque current command (Its*) and the exciting current command (Ims*) calculated by the substitute micro-computer 21. At step S3, it is executed to respectively compare the motor control commands (It*, Im*) with the motor control commands (It*, Im*) calculated by both micro-computers 11, 21, and further judged whether absolute values of the respective differences between the commands (It*, Im*) and the commands (Its*, Ims*) are less than the predetermined values (ΔIt1, ΔIm1: e.g. 40A) respectively. Note, in order to eliminate instant fluctuations and noises involved in the motor control commands, the above comparing process is carried out after the motor control commands have been subjected to low-pass filtering process. When either of the absolute values is equal to or more than the predetermined value for each command, that is, if it is judged that there exists a large difference between the calculation results of the micro-computers 11, 21, then the routine goes to step S4 to output the stop command and thereafter, the routine is ended.

In this way, according to the first embodiment of the invention, the motor control commands of the same kind are calculated and compared by two different micro-computers 11, 21. Then, when either of the differences is equal to or more than the predetermined value for each parameter (torque current, exciting current), the operation of the device is ended. Therefore, it is possible to avoid the influence due to the differences in the motor control commands rapidly, whereby the reliability of the control device for the electrical vehicle can be improved.

Return to FIG. 3, when such current commands calculated by two micro-computers 11, 21 are both less than the predetermined values respectively, it is estimated that the difference in the calculation results of the micro-computers 11, 21 is remarkably small, so that the routine goes to step S5. At step S5, it is executed to calculate the electric angle (θm) of the motor 5 on the basis of the motor rotary angle signal. At sequent step S6, it is carried out to input the motor electric angle (θs) calculated by the substitute micro-computer 21. Next, at step S7, it is judged whether the absolute value of a difference between the motor electric angle (θm) and the motor electric angle (θs) is less than a predetermined value (Δθ: for example 15 degrees). Note, in order to eliminate instant fluctuations and noises involved in the motor electric angle, the above comparing process is carried out after the motor electric angle signals have been subjected to low-pass filtering process. When the difference between the motor electric angles (θm, θs) is equal to or more than the predetermined value (Δθ), that is, if it is estimated that there exists a large difference between the calculation results of the micro-computers 11, 21, then the routine goes to step S8 to output the stop command and thereafter, the routine is ended.

Thus, the motor electric angles are calculated and compared by two different micro-computers 11, 21 and when the difference equal to or more than the predetermined value is detected, then the operation of the device is ended. Accordingly, it is possible to avoid the influence due to the increase in difference between the motor electric angles rapidly, whereby the reliability of the control device for the electrical vehicle can be improved.

If the difference between two motor electric angles calculated by the micro-computers 11, 21 is less than the predetermined value (Δθ), it is judged that the difference in calculation results by the computers 11, 21 is remarkably small and the routine goes to step S9. At step S9, it is executed to output the so-calculated motor electric angle (θm) to the substitute micro-computer 21. At sequent step S10, it is carried out to coordinately convert the three-phase motor currents (Iu, Iv, Iw) into the torque current (It) and the exciting current (Im) for the current feed-back values with reference to the motor electric angle (θm). At step S11, the current feed-back control is carried out on the basis of the motor current commands (Its*, Ims*) and the current feed-back values (It, θm) and additionally the calculated PWM signals are outputted.

When the device is energized in power, then the substitute micro-computer 21 executes processes of FIG. 4 repeatedly. At step S21, it is executed to calculate the torque current command (Its*) and the exciting current command (Ims*) on the basis of the torque command and the rotary angle signals. Next, at sequent step S22, it is execute to input the motor electric angle (θm) from the main micro-computer 11 and at sequent step S23, it is carried out to coordinately convert the three-phase motor currents (Iu, Iv, Iw) into the torque current (Its) and the exciting current (Ims) for the current feed-back values by the motor electric angle (θm). At step S24, it is executed to compare the motor control commands (Its*, Ims*) with the current feed-back values (Its, Ims), respectively and further judged whether absolute values of the respective differences between the commands (Its*, Ims*) and the feed-back values (Its, Ims) are less than predetermined values (ΔIt2, ΔIm2), respectively. Repeatedly, in order to eliminate instant fluctuations and noises involved in the motor control commands and the current feed-back values, the above comparing process is carried out after the motor control commands and the current feed-back values have been subjected to low-pass filtering process. When either one of the absolute values is equal to or more than the predetermined value, that is if it is judged that there exists a large difference between the calculation results of the micro-computers 11, 21, then the routine goes to step S25 where the stop command is outputted and the routine is ended.

In this way, the motor current commands and the current feed-back values are respectively compared and when either one of the resulting differences is more than the predetermined value, the operation of the device is ended. Therefore, it is possible to improve the reliability of the control device for the electrical vehicle.

It is noted that since the motor electric angle (θ) is calculated by integrating the motor rotary angle signals detected by the encoders 8, 9, even a slight difference would be integrated to a significant difference. Therefore, according to the embodiment, the motor electric angle (θm) used by the main micro-computer 11 for its current feed-back control is also used in the coordinates converting process (i.e. step S23) on the side of the substitute micro-computer 21. That is, since two different micro-computers 11, 21 employ the identical motor electric angle (θm) together, it is possible to eliminate an influence due to the integral difference, whereby the reliability of the device can be progressed.

When the differences between the current commands and the current feed-back values are both less than the predetermined values respectively, it is judged that the device has no trouble and the routine goes to step S26. At step S26, it is executed to calculate the electric angle (θs) of the motor 5 on the basis of the motor rotary angle signal. At sequent step S27, it is executed to input the motor electric angle (θm) calculated by the main micro-computer 11. Next, at step S28, it is judged whether the absolute value of a difference between the motor electric angle (θm) and the motor electric angle (θs) is less than predetermined value (Δθ). When the difference between two motor electric angles is equal to or more than the predetermined value, that is, if it is judged that there exists a large difference between the calculation results of the micro-computers 11, 21, then the routine goes to step S29 to output the stop command for the motor and thereafter, the routine is ended. On the contrary, when the difference between the motor electric angles is less than the predetermined value, that is, if it is judged that there exists a remarkably small difference between the calculation results of the micro-computers 11, 21, then the routine returns to step S21 to repeat the above-mentioned processes.

(Second Embodiment)

Next, referring to FIGS. 5 to 11, we describe the control device in accordance with the second embodiment of the present invention. As mentioned before, the second embodiment is directed to control an operation of the three-phase synchronous motor. From FIG. 5 to FIG. 11, elements identical to those of the first embodiment are indicated by the same reference numerals and the overlapping descriptions are eliminated.

Figure 5:
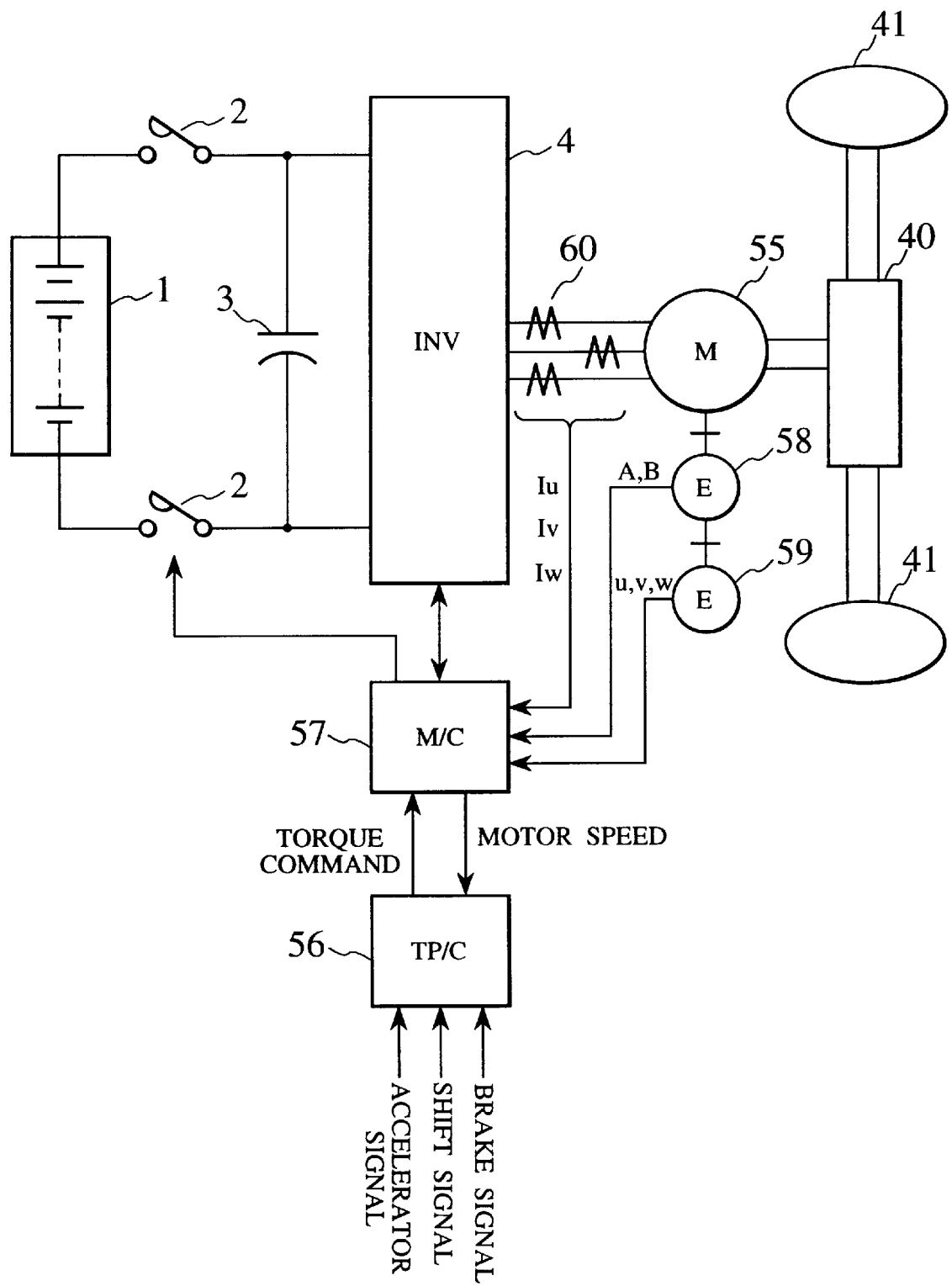
FIG. 5 is a schematic view showing a constitution of a control device for the electrical vehicle, in accordance with a second embodiment of the present invention.

In FIG. 5, the power inverter 4 is controlled by a torque processing controller 56 and a motor controller 57 both of which control the traveling of an electrical vehicle. A three-phase synchronous motor 55 is mechanically connected with two encoders 58, 59 both generating rotary angle signals of the motor 55 to a motor controller 57. A current sensor 60 detects three-phase currents (Iu, Iv, Iw) flowing through the motor 55 and also outputs the currents (Iu, Iv, Iw) to the motor controller 57.

The torque processing controller 56 calculates torque command on the basis of acceleration signal, shift signal, brake signal and motor speed and outputs the resulting torque command to the motor controller 57. The motor controller 57, which is a control device for controlling the inverter 4 in vector, calculates PWM signals for driving switching elements of the inverter 4 in accordance with the torque command from the torque processing controller 56, the rotary angle signals from the encoders 58, 59, and the motor currents (Iu, Iv, Iw) from the current sensor 60.

Namely, the motor controller 57 controls the three-phase AC motor 55 by the well-known vector control method, through the feed-back control computation of the motor speed and the motor current for the three-phase AC motor 55. A motor control calculating circuit in the motor controller 57 outputs d-axis current command Id and q-axis current command Iq defined on a rotating coordinate system, as well as a rotation angle of the rotating coordinate system defined relative to a corresponding stationary coordinate system. Here, d-axis is assumed to coincide with an axis of the rotating flux of the AC motor 55, and q-axis to be orthogonal thereto. These outputs from the motor control calculating circuit are inputted into the current control circuit, where PWM signals for producing three-phase AC current are calculated to the inverter 4. Whereby, the three-phase AC motor can be driven with a torque as desired.

The motor controller 7 further judges the error range in calculation results of the motor control commands and the actual situation in controlling the motor 55 and also outputs a stop signal to the inverter 4 and opens the switches 2 to cut off the power supply for the inverter 4, depending on the so-judged error range and control situation for the motor 55. Similar to the first embodiment, the motor 55 serves to drive wheels 41 through the transmission 40 in a vehicle.

Figure 6:
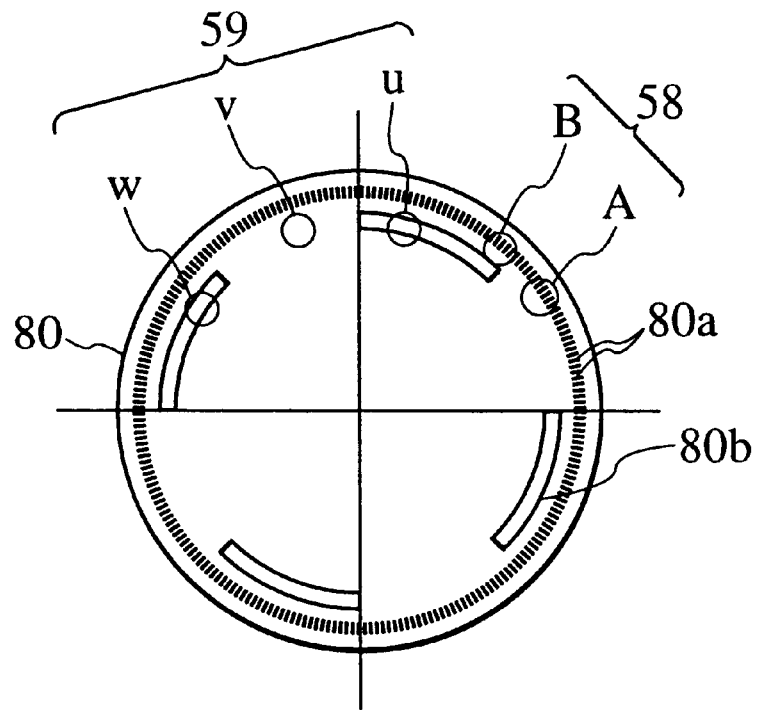
FIG. 6 is a schematic view showing an arrangement of encoders of the control device of the second embodiment.
Figure 7:
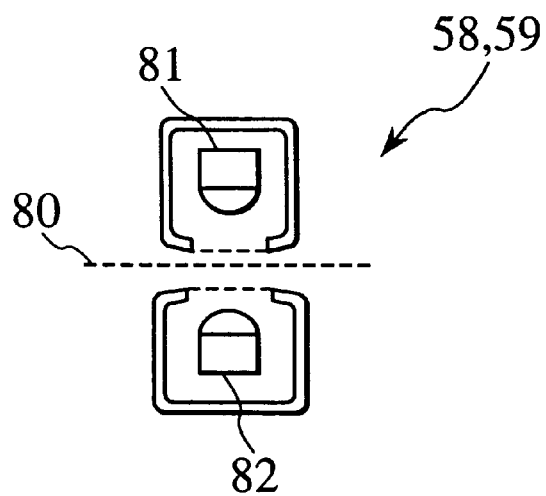
FIG. 7 is a cross-sectional view of a photocoupler for the encoders of FIG. 6.
Figure 8:
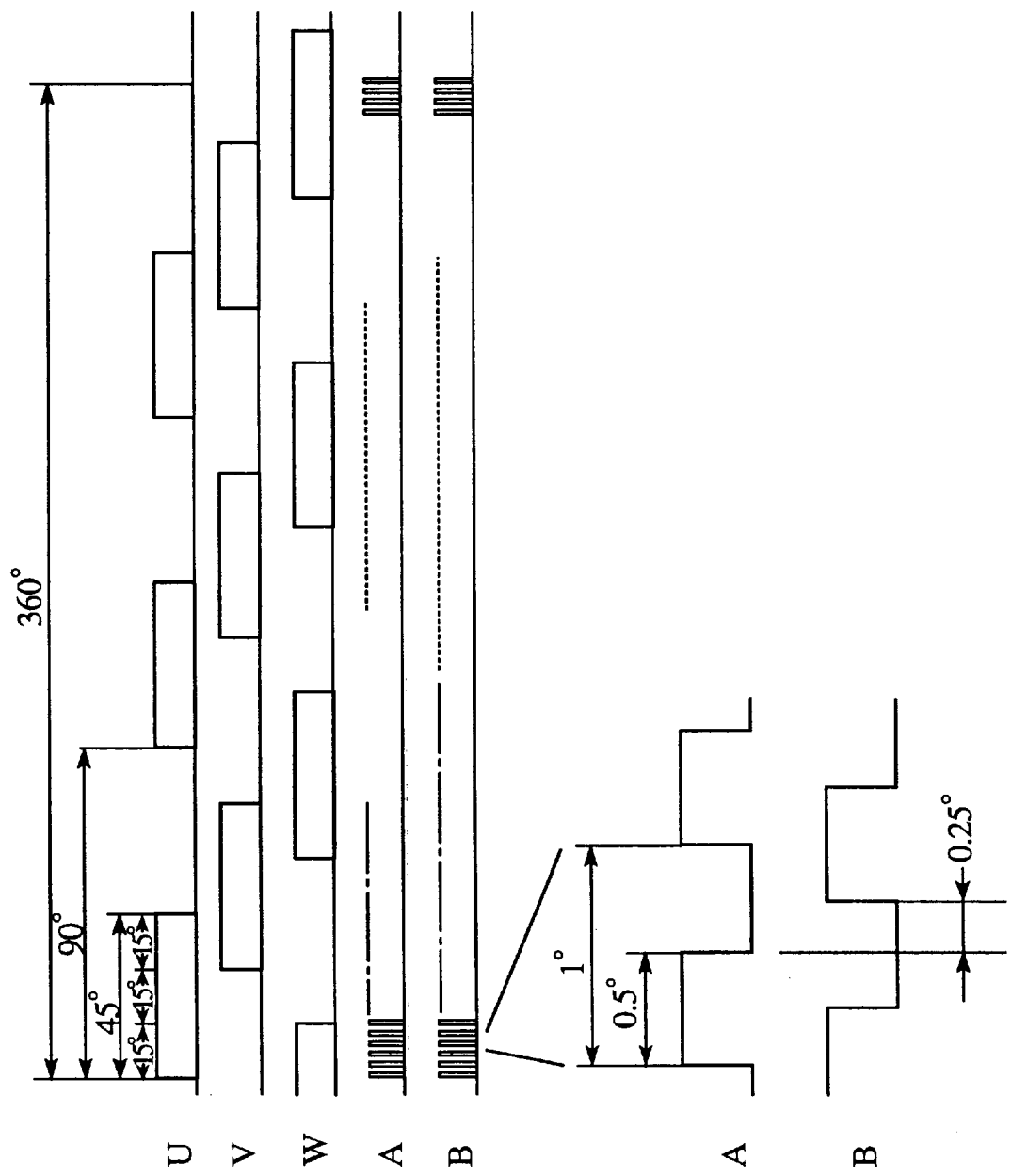
FIG. 8 is a diagram showing respective wave patterns of output signals from the encoders of the control device of the second embodiment.

Here, with reference to FIGS. 6, 7 and 8, we describe the encoders 58, 59 arranged on the synchronous motor 55. As shown in FIG. 6, photocouplers of the A, B-phase encoder 58 and the u, v, w-phase encoder 59 of the synchronous motor 55 are disposed at predetermined intervals, on a code wheel 80 connected with a motor shaft. The code wheel 80 is provided, on the whole outer periphery, with fine slits 80a for the A, B-phases. Additionally, the code wheel 80 has four arc slits 80b formed nearly inside the slits 80a to have respective widths of 45 degrees. As shown in FIG. 7, each photocoupler of the encoders 58, 59 is equipped with a LED (light emitting diode) 81 and a photo diode 82 arranged so as to oppose the LED 81 over the code wheel 80. These photocouplers are secured to a body of the motor 55. FIG. 8 shows respective wave patterns of signals from the respective encoders 58, 59. From the figure, it will be understood that the signals from the encoders 58, 59 exhibit the wave patterns corresponding to respective lengths of the slits 80a, 80b in the circumferential direction of the code wheel 80, respectively, thereby providing the motor electric angle signals.

Figure 9:
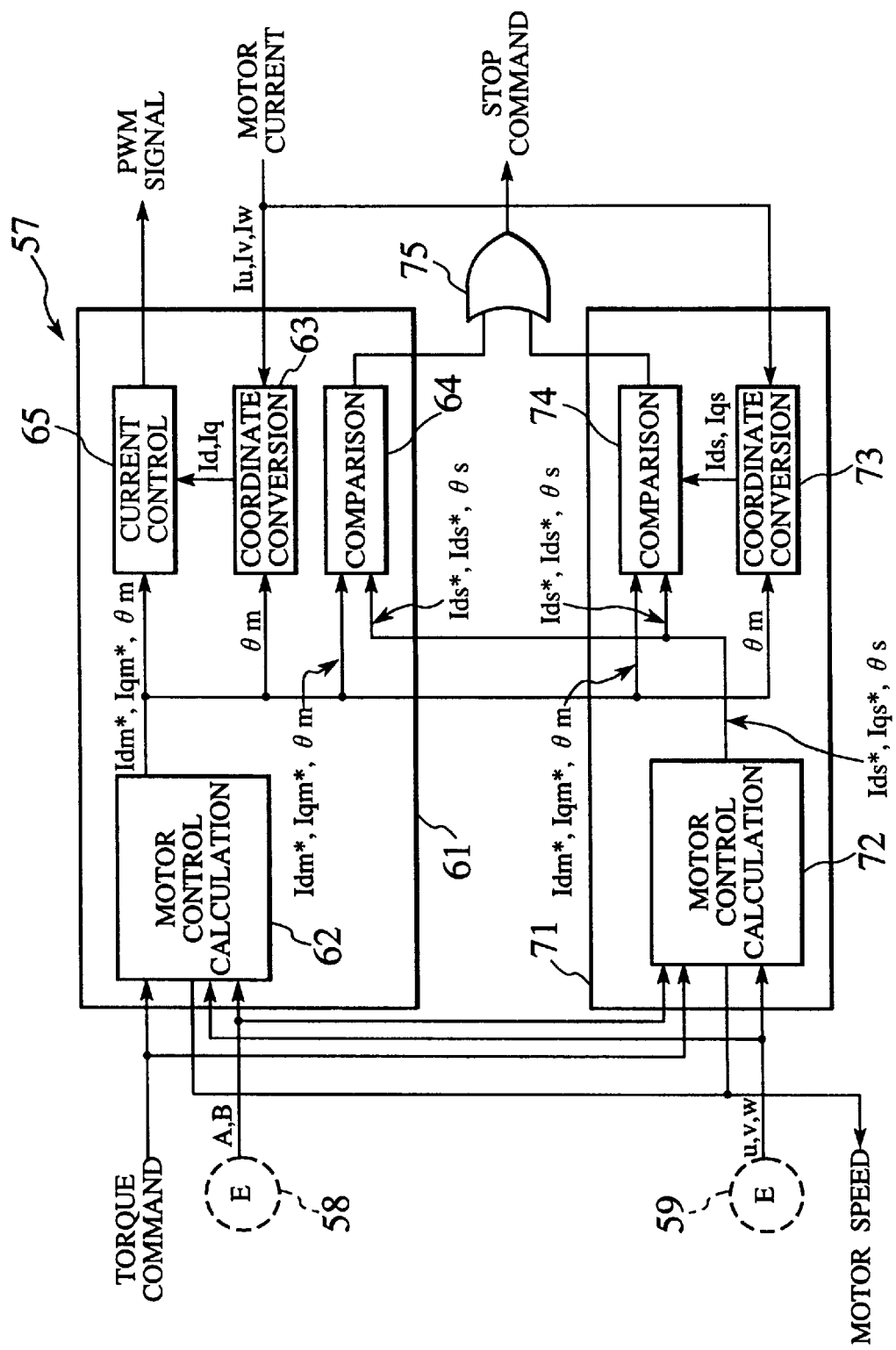
FIG. 9 is a block diagram of a motor controller of the control device of the second embodiment.

FIG. 9 is a block diagram of the motor controller 57.

The motor controller 57 comprises a main micro computer 61, a substitute micro computer 71 and an OR circuit 75. Two micro-computers 61, 71 calculate commands for controlling the motor 55 and compare then with other in order to detect the error range in calculation results obtained by the calculation of control command, respectively. The micro-computers 11, 21 further compare the commands with the actual motor control results to judge the control situation of the motor 5.

The main micro computer 61 includes a motor control calculating section 62, a coordinates converting section 63, a comparator section 64 and a current control section 65, all of which are constituted in the form of software. The motor control calculating section 62 calculates a d-axis current command (Idm*), a q-axis current command (Iqm*) and a motor electrical angle (θ*) as commands for control the motor 5, on the basis of the torque command from the torque processing controller 56 and the rotary angle signals from the encoder 58 for A, B-phases of the synchronous motor 55 and the encoder 59 for u, v, w-phases thereof. The coordinates converting section 63 coordinately converts the motor currents Iu, Iv, Iw detected by the current sensor 60 into feed-back values (Idm, Iqm) of the d-axis current and the q-axis current (3/2 phase conversion), on the basis of the motor electrical angle (θm) calculated by the motor control calculating section 62. The comparator section 64 compares the motor control commands (Idm*, Iqm*, θm) calculated by the motor control calculating section 62 with the motor control commands (Ids*, Iqm*, θs) calculated by a motor control calculating section 72 of the substitute micro computer 71, respectively, and also outputs a stop command to the OR circuit 75 if a predetermined difference exists in either comparison of the former command with the latter command. The current control section 65 executes feed-back control on the basis of the motor control commands (Idm*, Iqm*, θm) and the feed-back values (Idm, Iqm) and outputs the PMW signal to the inverter 4.

An motor control calculating section 72 of the substitute micro-computer 71 calculates a d-axis current command (Ids*), a q-axis current command (Iqs*) and a motor electrical angle (θs) as the motor control commands, on the basis of the torque command from the torque processing controller 56 and the rotary angle signals from the encoder 58 for A, B-phases of the synchronous motor 55 and the encoder 59 for u, v, w-phases thereof. The coordinates converting section 73 coordinately converts the motor currents (Iu, Iv, Iw) detected by the current sensor 60 into feed-back values (Ids, Iqs) of the d-axis current and the q-axis current (3/2 phase conversion), on the basis of the motor electrical angle (θm) calculated by the motor control calculating section 62 of the main micro computer 61. The comparator section 74 respectively compares the motor control commands (Ids*, Iqs*) calculated by the motor control calculating section 72 with the current feed-back values (Ids, Iqs) converted by the coordinates converting section 73 and also compares the motor electrical angle (θm) calculated in the main micro-computer 61 with the motor electrical angle (θs) calculated in the substitute micro-computer 71. In addition, the comparator section 74 outputs a stop command to the OR circuit 75 when a difference equal to or more than a predetermined value for each parameters is detected in any one of the above comparisons.

Figure 10:
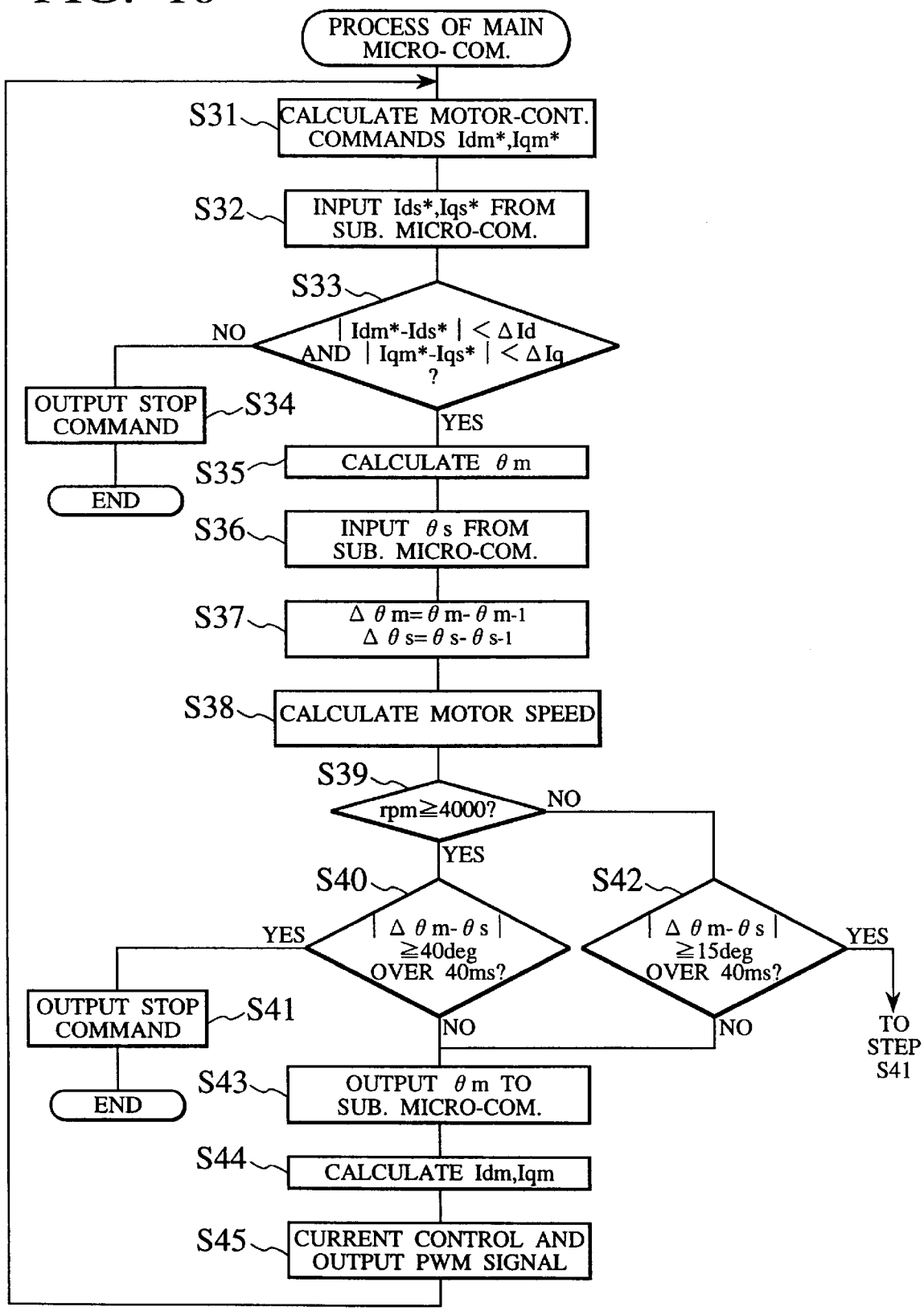
FIG. 10 is a flow chart showing processes by a main micro-computer of the motor controller of FIG. 9.
Figure 11:
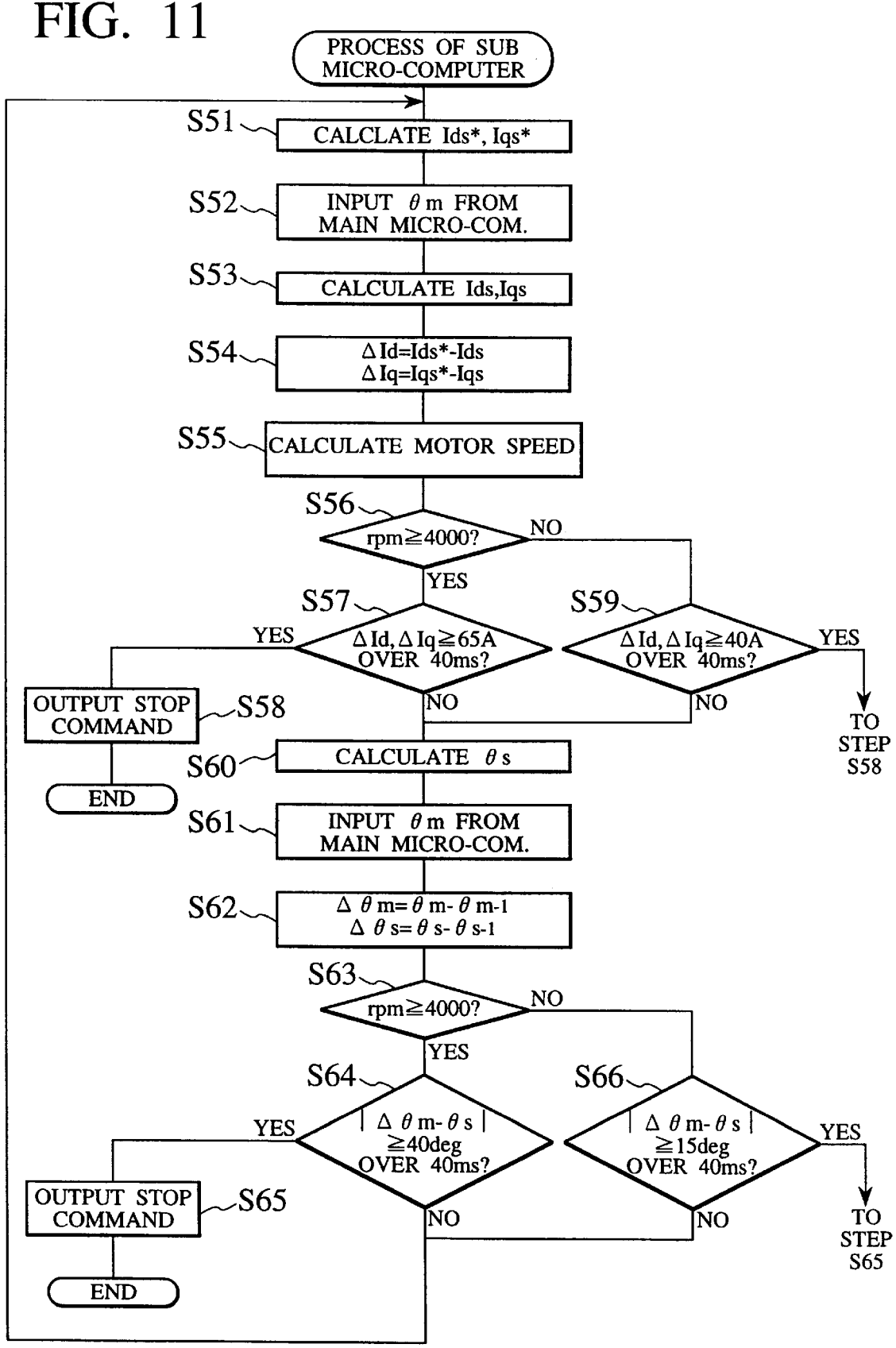
FIG. 11 is a flow chart showing processes by a substitute micro-computer of the motor controller of FIG. 9.

We now describe an operation of the control device of the second embodiment, with reference to FIGS. 10 and 11.

When the device is energized in power, then the main micro computer 61 executes processes of FIG. 10 repeatedly. At step S31, it is executed to calculate the d-axis current command (Idm*) and the q-axis current command (Iqm*) on the basis of the torque command and the rotary angle signal. Next, at sequent step S32, it is executed to input the d-axis current command (Ids*) and the q-axis current command (Iqs*) calculated by the substitute micro-computer 71. At step S33, it is executed to compare the d-axis current commands (Idm*, Ids*) with the q-axis current commands (Iqm*, Iqs*) calculated by both micro-computers 61, 71, respectively and further judged whether the absolute values of respective differences between the commands (Idm*, Ids*) and the commands (Iqm*, Iqs*) are less than predetermined values (ΔId, ΔIq), respectively. Preferably, both values (ΔId, ΔIq) are established to be 30A, together. Note, the above comparing process is carried out after the motor control commands have been subjected to low-pass filtering process in order to eliminate instant fluctuations and noises involved in the motor control commands. When either one of the absolute values of the differences is equal to or more than the predetermined value (ΔId; ΔIq), in other words, if it is judged that there exists a large difference between the calculation results of the micro-computers 61, 71, then the routine goes to step S34 to output the stop command and thereafter, the routine is ended.

In this way, since the motor control commands of the same kind are calculated and compared by two different micro-computers 61, 71 and when either of the differences is equal to or more than the predetermined value for each parameter, then the operation of the device is ended. Thus, it is possible to avoid the influence due to the differences in the motor control commands rapidly, whereby the reliability of the control device for the electrical vehicle can be improved.

When the current commands by two micro-computers 61, 71 are both less than the predetermined values respectively, it is judged that the difference in the calculation results of the micro-computers 61, 71 is remarkably small and the routine goes to step S35. At step s35, it is executed to calculate the electric angle (θm) of the motor 55 on the basis of the motor rotary angle signal. At sequent step S36, it is carried out to input the motor electric angle (θs) calculated by the substitute micro-computer 71. Next, at step S37, it is executed to calculate respective differences (Δθm, Δθs) between the electric angles (θm, θs) calculated by the micro-computers 61, 71 and the same angles (θm–1, θs–1) obtained in the previous routine.

Next, at step S38, the number of revolutions of the motor 55, i.e. the motor speed is calculated from the motor electric angle (Δθm). At step 39, it is judged whether the calculated motor speed is equal to or more than 4,000 rpm. When the judgement is Yes (i.e. 4,000 rpm or more), then the routine goes to step S40. At step S40, it is executed to calculate the absolute value of a difference between the difference (Δθm) and the difference (Δθs) obtained at step S37 and further judged whether the so-calculated absolute value is equal to or more than a predetermined value (e.g. 40 degrees). At this step S40, additionally, if the absolute value is equal to or more than the predetermined value (e.g. 40 degrees), it is also judged whether such a situation has continued for a period equal to or longer than a predetermined period (e.g. 40 ms). When the judgement at step S40 is Yes (i.e. 40 ms or longer), then the routine goes to step S41 to output the stop command for completing the process because of its largeness of difference.

Return to step S39, when the motor speed is less than the predetermined value (e.g. less than 4,000 rpm), then the routine goes to step S42. At step S42, it is executed to calculate the absolute value of the difference between the difference (Δθm) and the difference (Δθs) obtained at step S37 and further judged whether the so-calculated absolute value is equal to or more than another predetermined value (e.g. 15 degrees). At this step S42, additionally, if the absolute value is equal to or more than the predetermined value (e.g. 15 degrees), it is also executed whether the above situation has continued for a period equal to or longer than a predetermined period (e.g. 40 ms). When the judgement at step S42 is Yes (i.e. 40 ms or longer), then the routine goes to step S41 to output the stop command for completing the process because of its largeness of difference.

Also in this embodiment, since the motor control commands of the same kind are calculated and compared by two different micro-computers 61, 71 and when either one of the differences is equal to or more than the predetermined value, the operation of the device is ended. Therefore, it is possible to avoid the influence due to the differences in the motor control commands rapidly, whereby the reliability of the control device for the electrical vehicle can be improved.

At step S40 or S42, in either case that the absolute value of the difference between the difference (Δθm) and the difference (Δθ) is less than the predetermined value or the situation has continued in a period less than the predetermined period, the routine goes to step S43 since it is judged that a difference in calculation results by the micro-computers 61, 71 is remarkably small. At step S43, it is executed to output the calculated motor electric angle (θm) to the substitute micro-computer 71. At sequent step S44, it is carried out to coordinately convert the three-phase motor currents (Iu, Iv, Iw) into the d-axis current (Idm) and the q-axis current (Iqm) for the current feed-back values by the motor electric angle (θm). At step S45, the feed-back control is carried out on the basis of the motor current commands (Idm*, Iqm*) and the current feed-back values (Idm, Iqm) and additionally, the calculated PWM signals are outputted.

When the device is energized in power, then the substitute micro-computer 71 executes processes of FIG. 11 repeatedly. At step S51, in the motor control calculating section 72 of the substitute micro-computer 71, it is executed to calculate the d-axis current command (Ids*) and the q-axis current command (Iqs*) on the basis of the torque command from the torque processing controller 56 and the rotary angle signals from the encoder 59 for u, v, w-phases of the synchronous motor 59. Next, at sequent step S52, it is execute to input the motor electric angle (θm) from the main micro-computer 61 and at sequent step S53, it is carried out to coordinately convert the three-phase motor currents (Iu, Iv, Iw) into the d-axis current (Ids) and the q-axis current (Iqs) for the current feed-back values by the motor electric angle θm. At step S54, it is executed to calculate differences (ΔId, ΔIq) between the motor control commands (Ids*, Iqs*) and the current feed-back values (Ids, Iqs), respectively.

Next, at step S55, the number of revolutions of the motor 55, i.e. motor speed is calculated from the motor electric angle (θm). At step S56, it is judged whether the calculated motor speed is equal to or more than 4,000 rpm. When the judgement is Yes (i.e. 4,000 rpm or more), then the routine goes to step S57. At step S57, it is judged whether the so-calculated difference (ΔId or ΔIq) is equal to or more than a predetermined value (e.g. 65 A.) At this step S57, additionally, if it is also judged whether such a situation has continued for a period equal to or longer than a predetermined period (e.g. 40 ms). When the judgement at step S57 is Yes (i.e. 40 ms or longer), then the routine goes to step S58 to output the stop command for completing the process because of its largeness of calculation difference between the micro-computers 61 and 71.

Return to step S56, when the motor speed is less than the predetermined value (e.g. less than 4,000 rpm), then the routine goes to step S59. At step S42, it is judged whether the so-calculated difference (ΔId or ΔIq) is equal to or more than another predetermined value (e.g. 40 A). At this step S59, additionally, if it is also judged whether such a situation has continued for a period equal to or longer than the predetermined period (e.g. 40 ms). When the judgement at step S59 is Yes (i.e. 40 ms or longer), then the routine goes to step S58 to output the stop command for completing the process because of the largeness of calculation difference between the micro-computers 61 and 71. Note, the above comparing process is carried out after the difference between the motor control commands have been subjected to low-pass filtering process in order to eliminate instant fluctuations and noises involved in the motor control commands.

In this way, according to the embodiment, it is carried out to compare the motor control commands and the current feed-back values and when either of the differences is more than the predetermined value, the operation of the device is ended due to the estimated largeness of difference in calculation results between the micro-computers 61, 71. Thus, it is possible to avoid the influence due to the differences in the motor control commands rapidly, whereby the reliability of the control device for the electrical vehicle can be improved.

Repeatedly, since the motor electric angle (θ) is calculated by integrating the motor rotary angle signals detected by the encoders 58, 59, even a slight difference would be integrated to a significant difference. Therefore, also in this embodiment, the motor electric angle (θm) that the main micro-computer 61 employs for the current feed-back control is also used in the coordinates converting process to be executed on the side of the substitute micro-computer 71. Thus, since two different micro-computers carry out the processes while using the identical motor electric angle (θm), it is possible to eliminate an influence due to the integral difference, whereby the reliability of the device can be progressed.

At step S57 or step S59, when the differences (ΔId, ΔIq) are both less than the predetermined value or when the above situation has not continued so long as the predetermined period (e.g. 40 ms), the routine goes to step S60 since it is estimated that the control device has no trouble. At step S60, the motor electric angle (θs) is calculated on the basis of the motor rotary angle signals. At step 61, it is carried out to input the motor electric angle (θm) calculated by the main micro-computer 61. Next, at step S62, it is executed to calculate respective differences (Δθm, Δθs) between the electric angles (θm, θs) calculated by the micro-computers 61, 71 and the same angles (θm−1, θs−1) obtained in the previous routine, respectively.

At step S63, when it is judged whether the calculated motor speed is equal to or more than 4,000 rpm. When the judgement is Yes (i.e. 4,000 rpm or more), then the routine goes to step S64. At step S64, it is executed to calculate the absolute value of a difference between the difference (Δθm) and the difference (Δθs) obtained at step S62 and further judged whether the so-calculated absolute value is equal to or more than a predetermined value (e.g. 40 degrees). At this step S64, additionally if the absolute value is equal to or more than the predetermined value (e.g. 40 degrees), it is also judged whether such a situation has continued for a period equal to or longer than the predetermined period (e.g. 40 ms). When the judgement at step S64 is Yes (i.e. 40 ms or longer), then the routine goes to step S65 to output the stop command for completing the process because of its largeness of difference.

Return to step S63, when the motor speed is less than the predetermined value (e.g. less than 4,000 rpm), then the routine goes to step S66. At step S66, it is executed to calculate the absolute value of the difference between the difference (Δθm) and the difference (Δθs) obtained at step S62 and further judged whether the so-calculated absolute value is equal to or more than another predetermined value (e.g. 15 degrees). At this step S66, additionally, if the absolute value is equal to or more than the predetermined value (e.g. 15 degrees), it is also executed whether the above situation has continued for a period equal to or longer than a predetermined period (e.g. 40 ms). When the judgement at step S66 is Yes (i.e. 40 ms or longer), then the routine goes to step S65 to output the stop command for completing the process because of its largeness of calculation difference between the main micro-computer 61 and the substitute micro-computer 71. At either step S64 or S66, when the difference between the motor electric degrees less than the predetermined value or when the situation has continued in a period less than the predetermined period, the routine returns to step S51 where the above processes are repeated.

In this way, according to the embodiment, it is carried out to compare the motor electric angle (Δθm) provided from the main micro-computer 61 for coordinates conversion and the motor electric angle (Δθs) calculated on the side of the substitute micro-computer 71 and when the difference is more than the predetermined value, the operation of the device is ended due to the estimated largeness of difference in calculation results between the micro-computers 61, 71. Thus, even when the value changes due to the noise's mixing in transmitting the motor electric angle (Δθm) from the main micro-computer 61 to the substitute micro-computer 71, it is possible to improve the reliability of the control device.

It will be understood that, in the above-mentioned embodiments, the respective inverters 4 perform as the power inverting circuit of the invention, the motor controllers 7, 57 as the motor control circuit, the main micro-computers 11, 61 as the first calculation control circuit, the substitute micro-computers 21, 71 as the second calculation control circuit, the encoders 8, 58 as the first rotary angle detector, the encoders 9, 59 as the second rotary angle detector, and the current sensors 10, 60 perform as the current detector of the invention.

Note, since each control device of the above-mentioned embodiments is constituted in the form of software of the micro-computer without adding any circuit or installation, there is no possibility that the reliability of the control device is influenced with respect to the number of constituting parts of the device. However, of course, it is also possible to constitute a part or all of the control device in the form of hardware.

Finally, it will be understood by those skilled in the art that the foregoing description relates to preferred embodiments of the disclosed control device, and that various changes and modifications may be made to the present invention without departing from the spirit and scope thereof.

What is claimed is:

1. A control device for an electrical vehicle having a battery and a motor driven by the battery, the control device comprising:

a power inverting circuit for inverting a direct current power supplied from the battery into an alternating current power to apply the alternating current power to the motor;

a motor control circuit for controlling an operation of the power inverting circuit in accordance with a torque command, the motor control circuit having a first calculation control circuit and a second calculation control circuit; and a first and second rotary angle detector operationally connected to the motor, for detecting rotary angles of the motor;

wherein the first calculation control circuit calculates a motor electric angle (θm) on the basis of the rotary angle detected by the first rotary angle detector, while the second calculation control circuit calculates a motor electric angle (θs) on the basis of the rotary angle detected by the second rotary angle detector; and wherein the motor control circuit outputs the stop command to interrupt the alternating current power applied to when a difference between the motor electric angle (θm) and motor electric angle (θs) is equal to or more than the predetermined value.

2. A control device for an electrical vehicle having a battery and a motor driven by the battery, the control device comprising:

a power inverting circuit for inverting a direct current power supplied from the battery into an alternating current power to apply the alternating current power to the motor;

a motor control circuit for controlling an operation of the power inverting circuit in accordance with a torque command, the motor control circuit having a first calculation control circuit and a second calculation control circuit; and a first and second rotary angle detector operationally connected to the motor, for detecting rotary angles of the motor;

wherein the first calculation control circuit periodically calculates a motor electric angle (θm) on the basis of the rotary angle detected by the first rotary angle detector, while the second calculation control circuit periodically calculates a motor electric angle (θs) on the basis of the rotary angle detected by the second rotary angle detector; and wherein the first calculation control circuit calculates a first difference ($\Delta\theta m$) between the present motor electric angle ($\theta m$) and the previous motor electric angle ($\theta m-1$) and the second calculation control circuit calculates a second difference ($\Delta\theta s$) between the present motor electric angle ($\theta s$) and the previous motor electric angle ($\theta s-1$), and the motor control circuit outputs the stop command to interrupt the alternating current power applied to when a difference between the first difference ($\Delta\theta m$) and the second difference ($\Delta\theta s$) is equal to or more than the predetermined value.

3. The control device of claim 1, wherein the motor is a three-phase alternating current motor, the control devise further comprising current detector for detecting three-phase alternating currents flowing through the motor, wherein the first calculation control circuit converts the three-phase currents detected by the current detector into two-phase currents on the basis of the motor electric angle ($\theta m$) and also executes a current feedback control of the motor while comparing the two-phase currents with the motor control command calculated by itself, and wherein the second calculation control circuit converts the three-phase currents detected by the current detector into two-phase currents on the basis of the motor electric angle ($\theta m$) calculated by the first calculation control circuit and also outputs the stop command to interrupt the alternating current power applied to when a difference between the two-phase currents and the motor control command calculated by itself is equal to or more than the predetermined value.

4. The control device of claim 1, wherein the first and second calculation control circuits are constituted in the form of software of different micro-computers, respectively.

5. The control device of claim 2, wherein the first and second calculation control circuits are constituted in the form of software of different micro-computers, respectively.

* * * * *